May 16, 1967 J. R. MIMS 3,320,471

HIGH POWER AMPLIFIER HAVING A COOLING FLUID MANIFOLD ATTACHED TO THE SLOW-WAVE STRUCTURE

Filed April 9, 1962 3 Sheets-Sheet 1

INVENTOR
JAMES R. MIMS
BY Robert T. Dunn
AGENT

INVENTOR
JAMES R. MIMS
BY Robert T. Dunn
AGENT

INVENTOR
JAMES R. MIMS
BY Robert T. Dunn
AGENT

United States Patent Office 3,320,471
Patented May 16, 1967

3,320,471

HIGH POWER AMPLIFIER HAVING A COOLING FLUID MANIFOLD ATTACHED TO THE SLOW-WAVE STRUCTURE

James R. Mims, Natick, Mass., assignor to Raytheon Company, Lexington, Mass., a corporation of Delaware Filed Apr. 9, 1962, Ser. No. 185,989
2 Claims. (Cl. 315—39.3)

This invention relates generally to platinotron type power tubes and more particularly to the design of an amplitron tube incorporating novel features permitting high power operation.

Heretofore, platinotron type power tubes which include the amplitron and stabilitron have been constructed for operation at frequencies between L and X-band. In order to operate at, for example, the upper X-band frequencies, the dimensions of the wave propagating anode structure and interaction space adjacent the structure bounded by the structure and cathode are necessarily very small and difficult to cool during operation, thus limiting output power. Such tubes usually include structure for conducting a cooling fluid to the bulk of the anode so that the bulk conducts heat from the elements which form the wave conducting structure. However, the rate of heat transfer from the elements to the cooling fluid at high power operation has been insufficient, and, as a result, the anode elements overheat. In addition, the cathode is heated considerably by bombardment by electrons which gain energy from the waves conducted by the anode elements and, as a result, cathode temperature has been difficult to control during high power operation.

It is one object of the present invention to provide a platinotron type tube for high power operation in which overheating of the anode elements and the cathode is avoided.

It is one feature of the present invention to provide a bulk of thermally conductive material in intimate contact with the cathode to serve as a heat sink conducting heat from the cathode as required to prevent the temperature of the cathode from exceeding given limits. It is another feature to heat the cathode with power from an external source, preferably during intervals between tube operation, and to cool the cathode by conducting a cooling fluid in intimate contact with the bulk of thermally conductive material during tube operation to counteract excessive heating of the cathode by, for example, back electron bombardment. During the intervals between tube operation only a small portion of the whole cathode structure (the electron emitting part) is heated by power from an external source to the temperature required for efficient emission of electrons; the remainder of the cathode structure including the bulk of thermally conductive material is not heated. During tube operation, the cathode is heated by back bombardment of electrons which have gained energy from the waves conducted by the anode elements, and this heating is controlled by cooling the bulk of thermally conductive material in contact with the cathode.

Another feature of the invention which aids to reduce the temperature of the anode elements is included in the shape and location of fluid manifolds for conducting fluid for cooling the anode elements. These manifolds are relatively large and contained within the tube envelope. They are formed by jackets attached to the anode and which in turn support the anode elements. Thus, the anode cooling manifolds serve not only to conduct cooling fluid to and from the anode elements; they also support the elements.

In a preferred embodiment of the invention, two bulky thermally conductive bodies are in contact with the cathode. They are preferably made of copper, are conically shaped, and are disposed coaxially within the tube axis peak to peak supporting the cathode therebetween. The anode manifolds are shaped to fill the space between the conical bodies and support the anode elements which form a slow-wave propagating structure concentric with the cathode. Thus, the anode cooling fluid flows directly from the manifold to the anode element, and substantially all the fluid pressure drop occurs in the flow through the anode elements. This insures that fluid flow velocity through the elements is relatively high. Additional means are provided for conducting cooling fluid along the axis of the tube to the bulky thermally conductive bodies which contact the cathode. In operation, a high D.C. current is conducted from one of the conical bodies to the other through the cathode which is supported therebetween. This current which flows generally along the tube axis heats the cathode causing the emission of substantial numbers of electrons to start the tube. The electrical resistance of the cathode is substantially greater than the electrical resistance of the conical bodies which support it and which provide electrical connection to a D.C. power supply. As a result, substantially all the D.C. power is expended in the cathode, and very little is expended in the conical bodies which support the cathode.

These and other features and objects of the invention are apparent from the following specific description of embodiments of the invention taken in conjunction with the figures in which.

Figure 1:
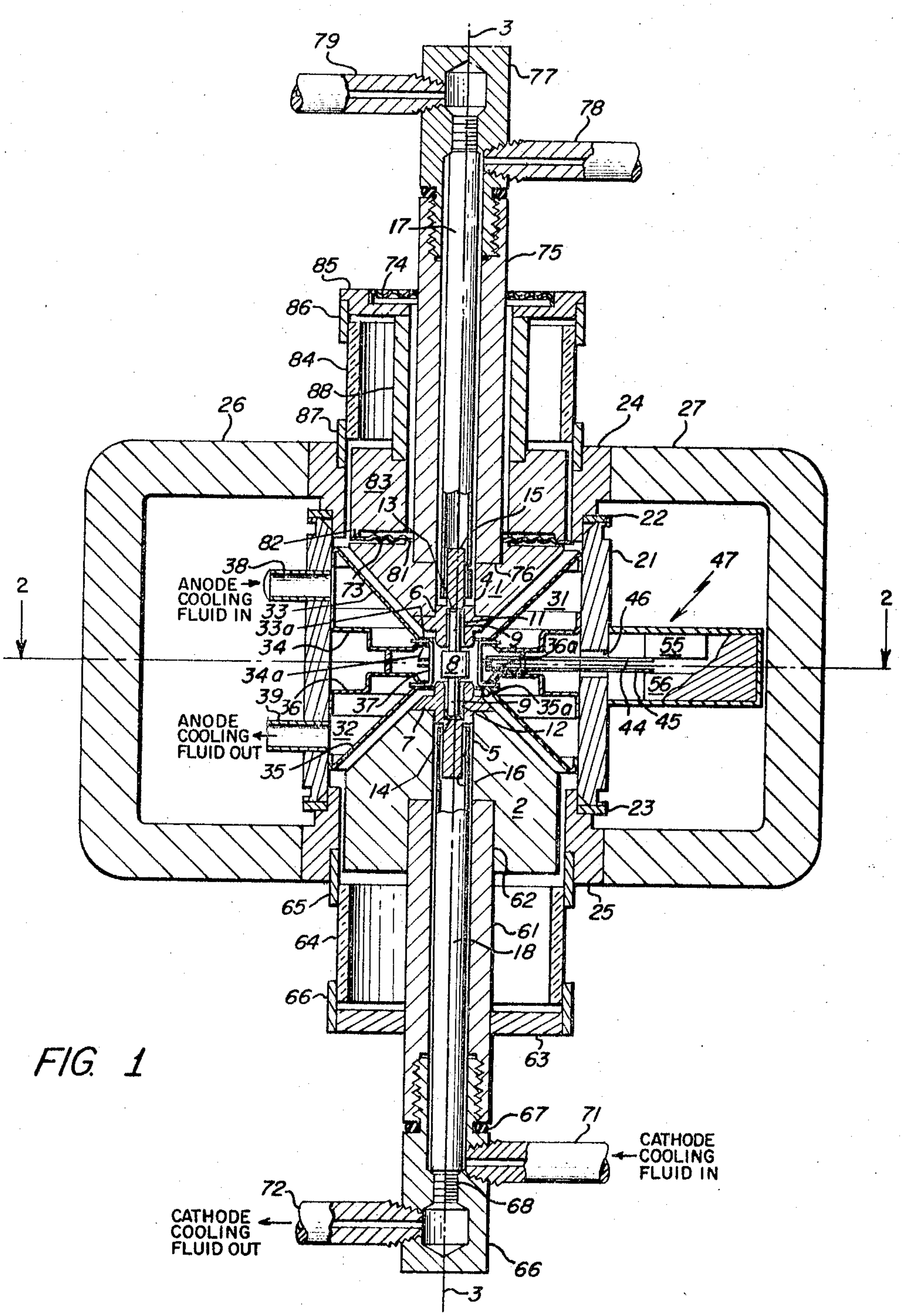
FIG. 1 is a side-sectional view of an amplitron designed for high power operation incorporating features of the invention.

Turning first to FIG. 1 there is shown an amplitron incorporating features of the invention; the principal parts of the amplitron include a cathode and a slow-wave propagating structure disposed cencentric with the axis of the tube and defining an electron interaction space therebetween. With this type of construction, most of the parts of the tube are figures of revolution about the tube axis. Accordingly, the side-sectional view of the tube just about defines all the parts and the relative locations of the parts. Additional views of various parts of the tube are included in the specific description below to supplement and more particularly to show details of parts which are not figures of revolution.

As shown in FIG. 1, the bulky conical-shaped bodies 1 and 2 are disposed along the tube axis 3 with the points of the cones toward each other. The conical bodies 1 and 2 are preferably composed of highly thermally and electrically conductive material such as copper. Each of these bodies is equipped with an opening 4 and 5 along the tube axis to form part of a fluid passage for conducting a coolant to cool and end shield plugs 6 and 7, a portion of which fit snugly into the openings 4 and 5, respectively, and are securely attached in intimate thermal and electrical contact thereto. The cathode is rigidly supported between the end shields 6 and 7 and includes a cylinder 8 concentric with a support rod 9. Cathode cylinder 8 and support rod 9 are preferably formed of a single piece of tungsten or similar refractory material of high melting temperature, relatively high electrical resistivity, and low work function. The ends of rod 9 are secured within openings 11 and 12 in the end shields 6 and 7 by copper films 13 and 14, respectively, which are fused to the rod and to the end shields so that the emitting element is rigidly supported between the end shields 6 and 7.

The end shields 6 and 7 include bosses 15 and 16, respectively, which project along the axis 3 into similar thin wall tubes 17 and 18 disposed along the axis. The tubes 17 and 18 serve to form passages for conducting cooling fluid to and from the cathode structure. They are enclosed within the axial openings 4 and 5 with a space between the outer walls of the tube and the openings. The tubes in turn enclose the bosses 15 and 16 with a space between the tube and boss. Thus, a U-shaped path is provided through the openings 4 and 5 for conducting fluid first in intimate contact with the conical bodies 1 and 2 and then in intimate contact with the bosses 15 and 16. The remaining structure extending away from the conical bodies 1 and 2 along the axis of the tube serves primarily to provide passage for conducting the fluid. In addition, the upper conical block includes a structure concentric with the tube axis permitting a certain amount of axial motion of the body 1 and the members that are attached rigidly thereto. Such motion is likely to occur when the cathode support structure and other parts of the tube contract and expand with temperature.

The anode includes a cylindrical wall 21 preferably of copper which seals to rings 22 and 23 at its upper and lower edges. These rings which are preferably made of copper are brazed to the cylindrical steel pole pieces 24 and 25, and the anode cylinder is welded to the rings. A pair of U-shaped magnets 26 and 27 each butt against the pole pieces 24 and 25 producing the transverse magnetic field within the tube interaction space which combines with a transverse electric field to compel electrons to move in interaction with waves conducted by anode elements.

Anode cooling fluid manifolds 31 and 32 are disposed adjacent the inside walls of the anode cylinder 21 and are formed by jackets as shown in FIG. 1 to conform to the space between the conical bodies 1 and 2 and the anode cylinder 21. The manifold jackets are preferably made of stamped steel plates which are generally ring-shaped and sealed to each other and to the anode walls as shown. Each manifold, for example, consists of an outer and inner jacket contoured as shown in FIG. 1. The outer and inner jackets 33 and 34 form the upper manifold 31, and jackets 35 and 36 form the lower manifold 32. Each of the jackets are preferably fastened to the inside walls of the anode cylinder 21 by, for example, welding along the outer periphery of the jackets. The jackets are joined along inner periphery at matching flanges such as **33*a* and 34*a* which hold the tubular anode elements 37. One end of each element is held between the flanges 33*a* and 34*a*, and the other end is held between similar flanges 35*a* and 36*a***. This structure provides a fluid passage directly from the manifolds to the elements.

The elements such as 37 are preferably made of stainless steel tubes which are generally U-shaped as shown and arranged around the axis of the tube. The ends of each of these tubes are sandwiched between the jacket flanges and sealed thereto so that the flow of cooling fluid is substantially equal through each of the tubes 37. The manifold 31 connects to a pipe 38 extending through anode cylinder 21, and similarly manifold 32 connects to a pipe 39. A pump system not shown pumps fluid under considerable pressure through pipe 38 into the manifold 31, and this fluid flows through the tubular anode elements 37 to manifold 32 and from there back to the pump system via pipe 39. Since substantially all fluid pressure drop occurs in flow through the elements, very high fluid flow rates through the elements can be obtained readily. This insures high heat transfer rates through the walls of the tubular elements to the cooling fluid so that the temperature of the elements does not exceed predetermined limits during high power operation.

Figure 2:
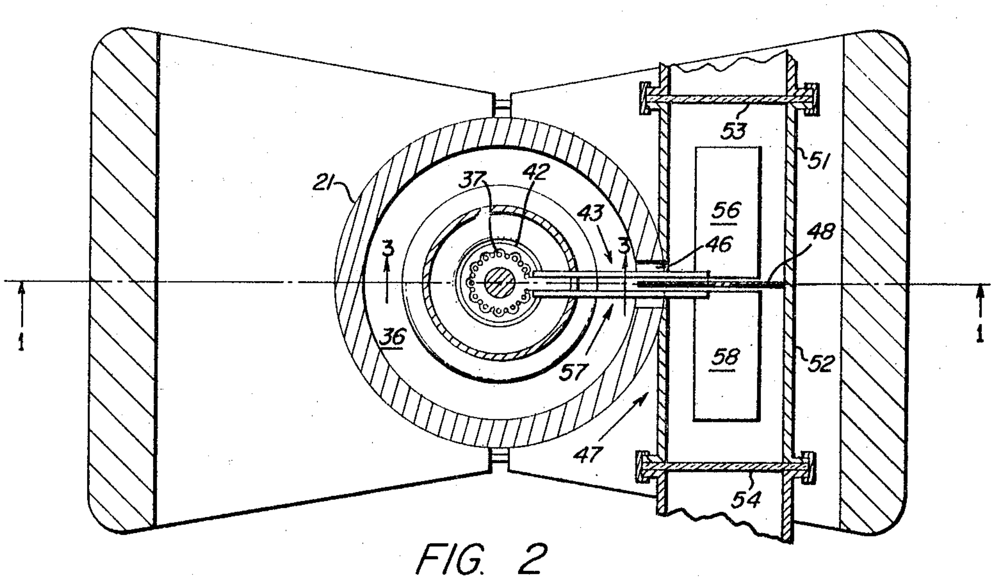
FIG. 2 is a plan-sectional view of the same tube.
Figure 3:
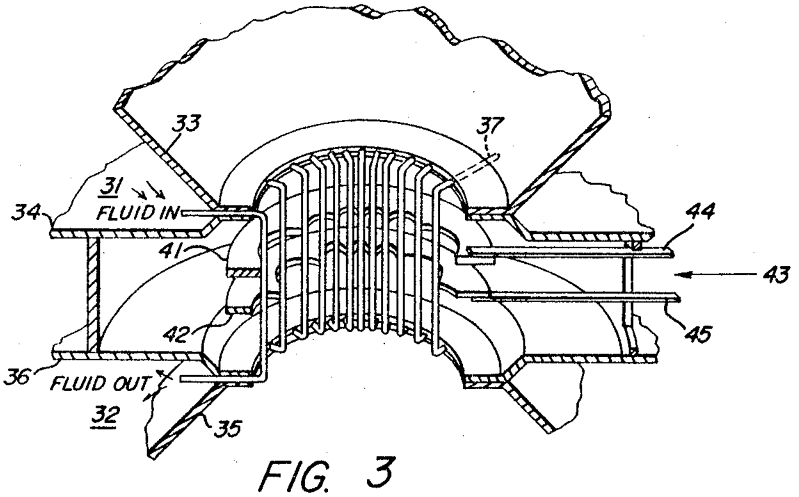
FIG. 3 is an enlarged perspective of a section taken through the anode to show details of anode construction.

FIG. 2 is a sectional plan view taken as shown in FIG. 1 to illustrate the arrangement of the tubular anode elements 37 around the axis of the tube, and FIG. 3 is an enlarged perspective view showing a cutaway of the anode to illustrate the arrangement of the elements 37, and the jackets 33–36 which form the manifolds and hold the elements. FIG. 3 also illustrates a structure for strapping the elements 37 together and for coupling input and output transmission lines thereto. A similar structure is shown in considerable detail in copending United States application Ser. No. 803,326, filed Mar. 31, 1959, by William A. Smith, Jr., et al., now Patent No. 3,096,457, issued July 2, 1963. As shown in FIG. 3, one group of alternate elements is connected together by an electrically conductive strap 41, while the other group of alternate elements is similarly connected together by a conductive strap 42. This technique for coupling elements is called $\pi$ mode strapping and is intended to insure that adjacent of the elements 37 conduct RF waves in opposite phase. As a result, voltage at corresponding points on the straps 41 and 42 is at opposite phase. FIG. 3 illustrates one method of coupling a two-element transmission line 43 formed by conductors 44 and 45 which connect to the straps 41 and 42, respectively. The two elements 44 and 45 form an output transmission line which extends substantially radially from the axis of the tube through an opening 46 in the anode cylinder 21 and into a waveguide structure 47. Waveguide structure 47, as shown in FIG. 2, includes two sections separated from each other by a radio frequency barrier 48 to form input waveguide and output waveguides 51 and 52. Each of these waveguides couples to additional waveguide structures via waveguide windows 53 and 54 which form a vacuum-tight seal with the waveguides 51 and 52, respectively. The input and output waveguides each include symmetrical ramp-shaped ridges. The ramp-shaped ridges 55 and 56 in the input waveguide 51 connect to the elements 44 and 45 of input transmission line 43. A similar two-element output transmission line 57 also includes elements attached to the straps 41 and 42 and connects the straps to the ramp-shaped ridges such as 58 in the output waveguide 52 in a similar manner.

A separate structure is provided for conducting a cooling fluid to each of the conical bodies 1 and 2 for cooling the body and for cooling the end shields which support the cathode. As shown in FIG. 1, the lower structure for cooling the conical body 2 includes a thick wall tube 61 securely fastened within an opening 62 in the conical body and surrounding the tube 17 with a space between the inner wall of tube 61 and the outer wall of tube 18. The tube 61 seals to a lower end plate 63 which in turn attaches to the pole piece 25 for insulated support. For this purpose, ceramic cylinder 64 is attached at one end to pole piece 25 by a Kovar cylinder 65 and is attached at its other end to end plate 63 by a Kovar cylinder 66. Additional structure is attached to the portion of cylinder 61 which extends beyond the plate 63 for conducting a cooling fluid into the passageway defined by the inner wall of tube 61 and the outer wall of tube 18 and for conducting fluid from the passageway defined by the inner wall of tube 18. This structure includes, for example, a cap 66 which threads into the end of cylinder 61 and seals thereto by, for example, a rubber O ring 67. The cap 66 is threaded inside to accommodate threads 68 at the end of the tube 18. These threads form a barrier between the passage for conducting fluid to the cathode and the passage for conducting fluid from the cathode. Pipes 71 and 72 are threaded to openings in cap 66 on opposite sides of the threads 68 and serve to conduct the cathode cooling fluid to and from the tube.

A similar upper structure is provided for cooling the upper conical body 1. In addition, this upper structure includes diaphragms 73 and 74 which support the conical element 1 from parts rigidly attached to the pole piece 24 and permits the element 1 to move along the axis 3 as the tube parts expand and contract during operation. Parts which are rigidly attached to the conical body 1 include a thick wall tube 75 which fits within and seals to an opening 76 in body 1 and a cap 77 from which project the pipes 78 and 79 similar to cap 66 and pipes 71 and 72. Cooling fluid preferably flows into pipe 78 and out of pipe 79.

The diaphragm 73 is attached to a boss 81 on body 1 along the inner periphery of the diaphragm, and the other periphery of the diaphragm 73 is attached to a boss 82 along the bottom of ring block 83. The block 83 is supported by rigid attachment to the pole piece 24 which includes a ceramic cylinder 84 similar to ceramic cylinder 64 for providing support and electrical insulation. The ceramic cylinder 84 attaches and seals to upper plate 85 by a Kovar cylinder 86 sealed to one edge of the ceramic cylinder. The other end of ceramic cylinder 84 seals to a similar Kovar cylinder 87 which in turn seals to the pole piece 24. The support structure is completed by cylinder 88 which connects the inner edge of plate 85 to the righ block 83. The diaphragm 74 seals to the outer wall of thick wall tube 75 and to the upper plate 85, thus completing the support of the upper part of the cathode structure from the pole piece 24. It is preferred that two diaphragms such as 73 and 74 be employed to prevent radial motion of any parts of the upper cathode structure, while at the same time permitting axial motion. Use of a single diaphragm would not accomplish this.

Figure 4:
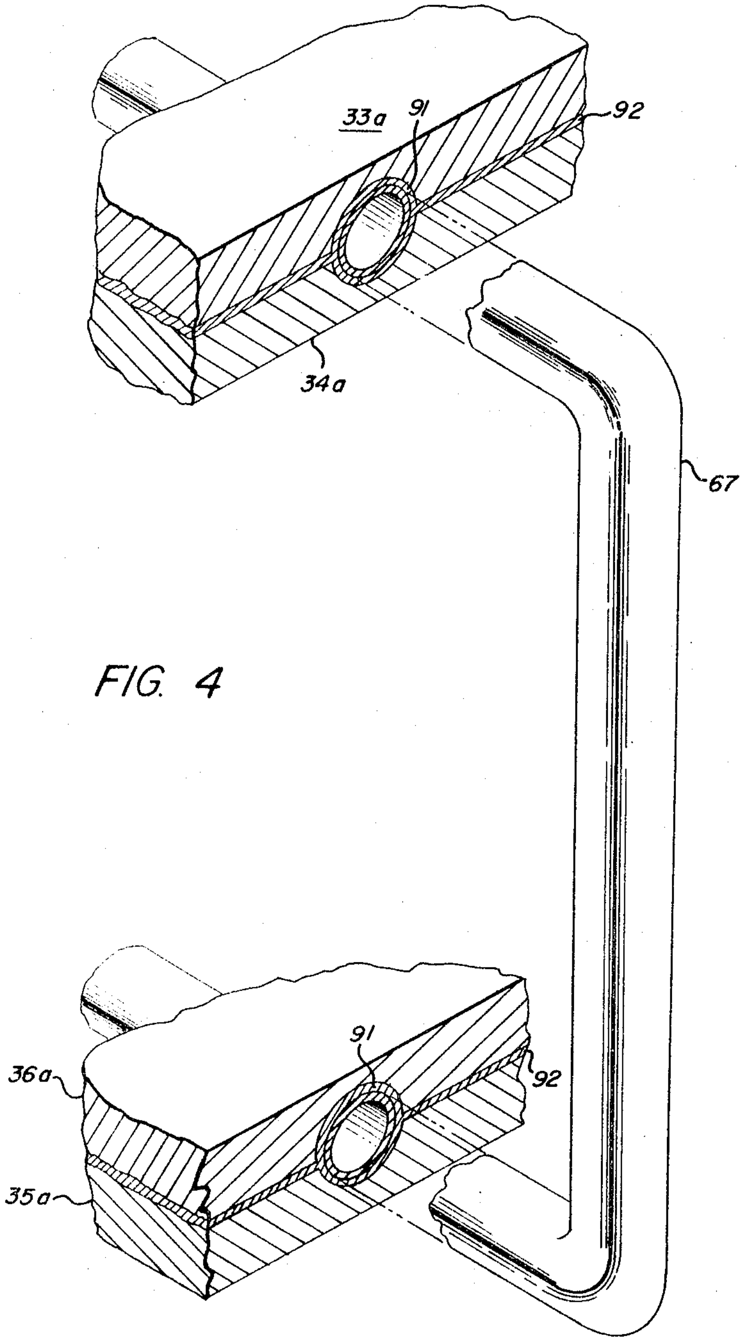
FIG. 4 is a further enlargement to show the structure securing each of the anode elements to facilitate cooling of the element.

FIG. 4 illustrates an enlarged view of one of the elements 37 to show the structure for attaching the elements to the jackets which define the upper and lower anode manifolds 31 and 32. As mentioned above, each element is preferably a U-shaped stainless steel tube. One end of the tube is sandwiched between jacket flanges 33*a* and 34*a*, and the other end is sandwiched between flanges 35*a* and 36*a*. A circular hole 91 is drilled along the faces of the flanges. This hole is concentric with the one end 37*a* of the tube 37 and of the same diameter as the outer diameter of the tube. At assembly, the flanges 33*a* and 34*a* are joined together with the one end 37*a* of the tube 37 therebetween in registry with the hole 91, and a solder joint 92 is made between the flanges and around the portion of the tube end 37*a* held therebetween. The other end 37*b* of the U-shaped tube 37 is sealed in a similar manner between flanges 35*a* and 36*a*.

This completes a description of one specific embodiment incorporating features of the invention including a multitude of parts composed of various designated materials. It should be noted, however, that other similarly shaped parts composed of materials having similar qualities could be substituted without deviating from the spirit and scope of the invention. Furthermore, it should be apparent that numerous features of the invention could be incorporated in other type tubes which do not fall into the general classification of platinotron type tubes. Many of the features, for example, could be employed in the construction and operation of a magnetron and in certain types of crossed-field traveling wave tubes generally known as M-type traveling wave tubes without deviating from the spirit and scope of the invention as set forth in the claims.

What is claimed is:

1. An electron discharge device including an envelope enclosing a slow-wave propagating structure having a plurality of tubular elements and a central cathode electrode coextensive with said structure defining an interaction space therebetween comprising:

a pair of oppositely disposed conical shaped bodies of thermally conductive material within the envelope of said device contiguous with said coextensive electrode for conducting heat therefrom;

and cooling fluid manifolds formed by jackets attached to the inside wall of said envelope and formed to substantially fill the space between said conical shaped bodies for supporting said slow-wave structure and for conducting a cooling fluid directly to elements thereof.

2. An electron discharge device including an envelope enclosing a slow-wave propagating structure having a plurality of tubular elements and a central cathode electrode coextensive with said structure defining an interaction space therebetween comprising:

a pair of oppositely disposed conical shaped bodies of thermally conductive material within the envelope of said device contiguous with said coextensive electrode for conducting heat therefrom, one of said conical bodies being free to move in an axial direction to absorb axial expansion of said electrode;

and cooling fluid manifolds formed by jackets attached to the inside walls of said envelope substantially filling the space between said conical shaped bodies for supporting elements of said structure and for conducting a cooling fluid in proximity with said elements to cool them.

References Cited by the Examiner

UNITED STATES PATENTS

| | | | |
|---|---|---|---|
| 2,502,405 | 3/1950 | Brown | 315—39.69 |
| 2,719,240 | 9/1955 | Walker | 313—37 |
| 2,728,029 | 12/1955 | Finger | 315—39.69 |
| 2,745,987 | 5/1956 | Dench et al. | 313—36 |
| 2,802,125 | 8/1957 | Nedderman | 313—37 |
| 2,888,609 | 5/1959 | Smith | 313—35 |
| 2,956,204 | 10/1960 | Dohler et al. | 315—30.73 |
| 3,231,780 | 1/1966 | Feinstein | 315—39.3 |

HERMAN KARL SAALBACH, *Primary Examiner.*

S. CHATMON, *Assistant Examiner.*